United States Patent [19]

Dreyfuss et al.

[11] 3,875,826

[45] Apr. 8, 1975

[54] DEVICE FOR THE ROTATION OF A PIPE

[75] Inventors: Wilfried Dreyfuss, Krahenwinkel; Hartmut Oberdörfer, Berenbostel, both of Germany

[73] Assignee: Weatherford Oil Tool G.m.b.H., Krahenwinkel, Germany

[22] Filed: Dec. 18, 1973

[21] Appl. No.: 425,872

[52] U.S. Cl. ............................................. 81/57.18
[51] Int. Cl. .......................................... B25b 17/00
[58] Field of Search ....................... 81/57.18, 57.21

[56] References Cited
UNITED STATES PATENTS

| | | | |
|---|---|---|---|
| 2,550,045 | 4/1951 | De Hetre | 81/57.18 |
| 2,703,221 | 3/1955 | Gardner | 81/57.18 |
| 3,023,651 | 3/1962 | Wallace | 81/57.18 |
| 3,261,241 | 7/1966 | Catland | 81/57.18 |

Primary Examiner—James L. Jones, Jr.
Attorney, Agent, or Firm—Ernest F. Marmorek

[57] ABSTRACT

A power operated tong for rotating pipes for boreholes and having an opening corresponding to the external diameter of the pipe to be rotated, which tong is also provided with means for the automatic gripping of the pipe and for closing of its opening so that a closed ring-system is created which is connected in a clamping manner to the pipe.

8 Claims, 6 Drawing Figures

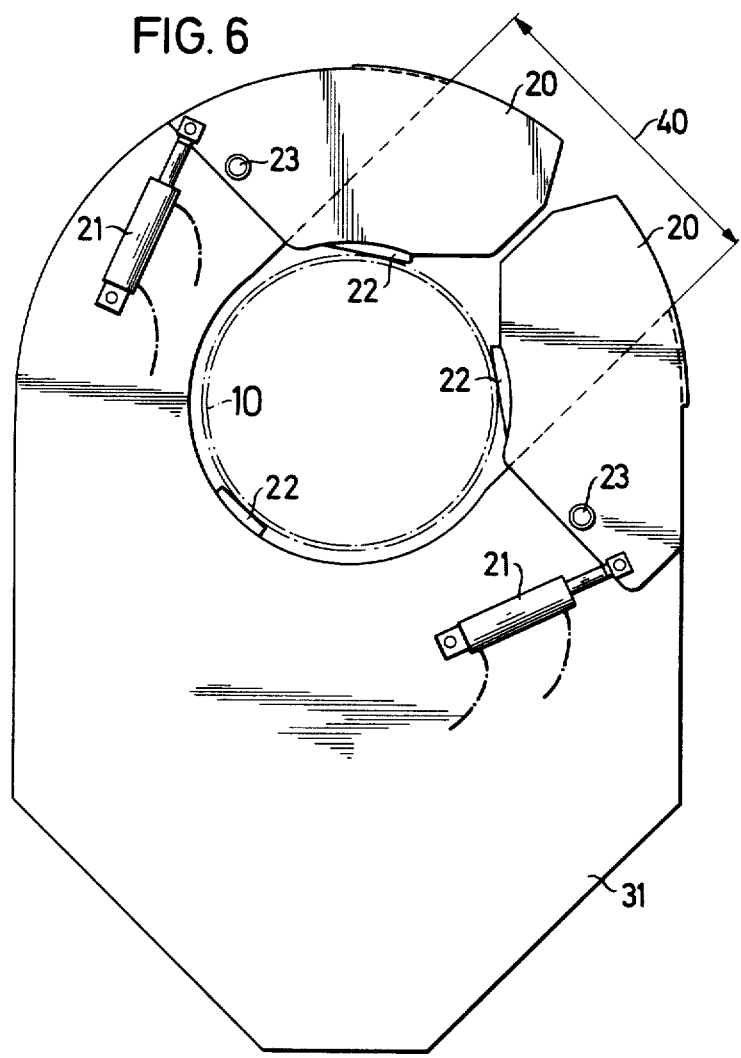

DEVICE FOR THE ROTATION OF A PIPE

The present invention relates to a device for rotating a pipe, especially a casing pipe for boreholes, by means of a gear toothed ring connected with a driving device such as a pinion, whereby said gear toothed ring is provided with an opening corresponding to the external diameter of the pipe and is arranged between two plates, which are each provided with an opening of similar width and are coaxial with the gear toothed ring, whereby clamping jaws, which are radially movable for grasping the pipe, are arranged on the plates and whereby cams on the inner side of the gear toothed ring are assigned to said clamping jaws.

It is known to arrange the clamping jaws on a closed ring-shaped member, with which engages a driving device. However, a closed ring-shaped member can only be moved in an; axial direction with respect to the pipe, but not a radial direction to the same, so that a lateral mounting or dismounting of the contrivance is not possible. As a result of this, the field of application is limited.

In order make the long elements capable of grasping and depositing in a radial direction it is known to place the clamping jaws into an open ring-shaped member which, however, permits only relatively slight torsional moments for rotating the pipe, since otherwise said ring-shaped member would expand, or a complicated method of constructing the pincer-housing would become necessary in order to avoid damages of this kind. Moreover, in the cases of all known tong elements, special measures have to be taken to change the direction of rotation which meansures, in part, have to be performed manually.

To bring radially removable tongs against the pipe in cases of simultaneous centering, is difficult and time consuming. In the case of the conventional method a tong has to be manually pressed against the pipe and must be kept there until it is closed and until the clamping jaws have seized the pipe in a centering manner.

It is therefore the task of the present invention to impart such a shape to the device of the initially mentioned type, that the disadvantages of the known devices are eliminated, and that higher torsional moments than heretofore can be exerted on the pipe, or that for certain torsional moments easier construction methods are possible, without the device being damaged by the high radial forces which occur and act upon the gear toothed ring. Furthermore, it should be possible for the device to operate in both directions of rotation, without the heretofor additional measures being required, such as e.g. turning the entire device or undertaking manual changes of components of said device. At the same time the automatic grasping of a pipe, connected with an automatic centering of the entire device should be made possible.

The solution based on the present invention is characterized by means for the automatic attachment onto the pipe and for the subsequent turning of the gear toothed ring with respect to the plates in both directions of rotation, until the openings are mutually displaced by about 180° from one another, so that a closed ring is created which is connected in a clamping position against the pipe.

By turning the gear toothed ring against the plates which encompass it, despite the openings which now lie opposite one another, a closed ring is created which has a loading capacity of similar order of magnitude as the conventional ring-shaped members without openings. This ring-shaped member is formed automatically without any additional manual measures which make the mutual displacement of the components possible. At the same time, the entire device, which form the tong, can be applied without great auxiliary force onto the pipe to be rotated and can be centered. Thereby, the hitherto existing disadvantages of an open tong compared to a closed tong are eliminated while maintaining the great advantages of an open tong.

As further development in accordance with the present invention it is suggested to axially displace the respective cams of the gear toothed ring and the clamping jaws in such a manner with respect to one another, that each cam can only be touched by the clamping jaw assigned to it. It is assured therewith that the gear toothed ring can be rotated in both directions of rotation by almost 180° within the plates encompassing it. Likewise, to facilitate an automatic rotatability of the gear toothed ring and therewith for the purpose of screwing-in and screwing-out of a pipe, retaining pins which can be automatically connected and disconnected, are arranged on the housing on both sides of its opening, whereby said retaining pins which are in the form of lifting cams with roof-shaped abutting surfaces, are provided for the axially displaceable actuating pin arranged in the plates, whereby said actuating pins manipulate likewise axially displaceable retaining pins which are carry in the gear toothed ring, whereby abuttment elements in the plates are assigned to the retaining pins. Through this it is possible to release the gear toothed ring from any kind of position and to go in the opposite direction of rotation until the clamping jaws have again clasped.

So as to guarantee that, on change of the direction of rotation, the retaining pins can pass by one another, the afore mentioned individual components are cut-out or worked-out unilaterally and in a mirror image form. For the attainment of the same purpose it is possible as an alternative to arrange the retaining pins with its lifting cams on different radii.

In order to guarantee the method of working of the entire device not only during the actual operation, but also during grasping and depositing operations, it is provided in a further embodiment of the present invention to affix, on both sides of the opening, hydraulically or pneumatically pivotable gripping and centering doors onto the gear toothed ring and onto the housing encompassing the plates. Each centering door bears on its inner side a centering for which is tangent to the circumference of the pipe and which, on closing of the doors, press the pipe against a similar abuttment at the bottom of the opening of the housing and therewith complete the centering operation.

In the drawing, an exemplified embodiment is schematically illustrated and described.

FIG. 6 shows the topview of the entire device with hydraulically operated gripping and centering doors.

Figure 1:
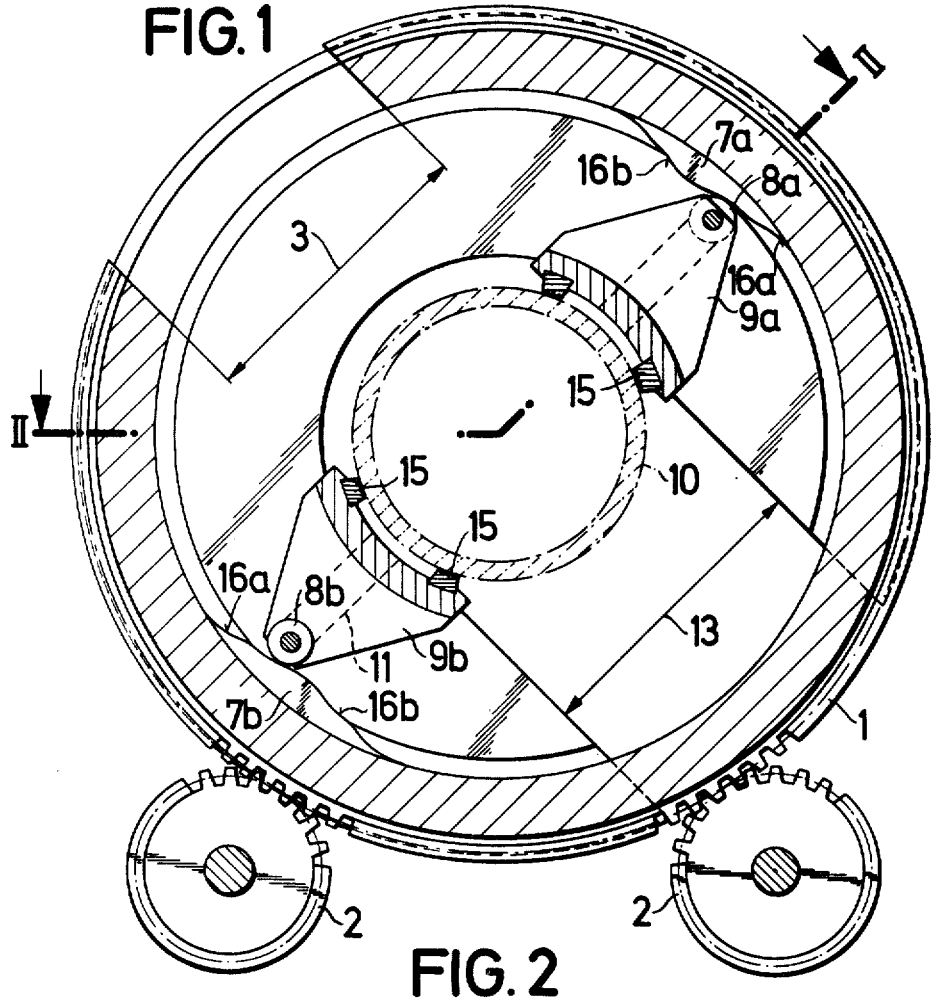
FIG. 1 shows a transverse section through the gear toothed ring along line I—I of FIG. 2.
Figure 2:
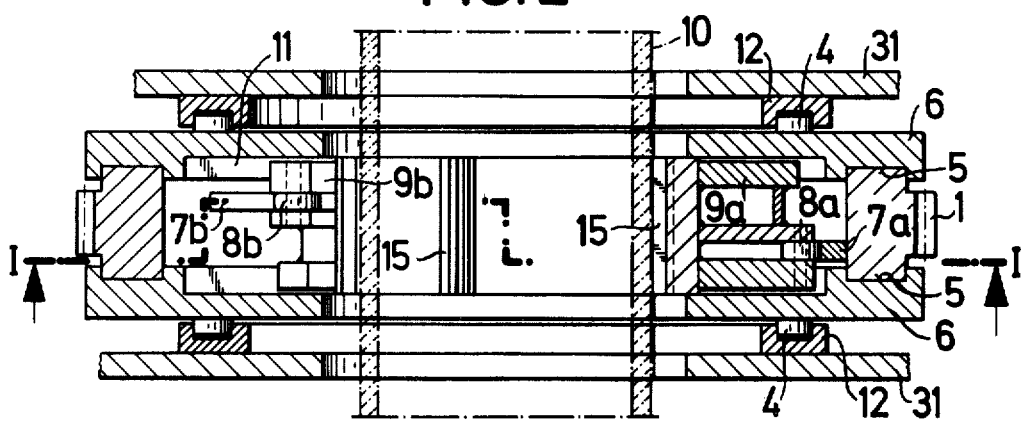
FIG. 2 shows an elevational section along II — II of FIG. 1.

The gear toothed ring 1 is engaged with driving pinions 2 and, is arranged on both sides in interceding annular grooves 5 (FIG. 2) of the circular guide plates 6 in a concentrically pivotable manner and includes an opening 3. The plates 6, as well as the housing 31 which encloses the gear toothed ring and the plates, are likewise provided with openings 13 and 40. At its inner side, the gear toothed ring 1 carries two diametrically opposite cams 7a and 7b, against which the rollers 8a and 8b of the radially displaceable clamping jaws 9a and 9b, which are arranged on the plate 6, can abut. The two cams 7a and 7b have two abutting surfaces 16a and 16b each, which lie diagonally opposite to one another, so that an accurate centering can be achieved of pipe 10 which is the pipe to be rotated. The clamping jaws 9a and 9b interact with the pipe 10 which is to be moved and are retained by appropriate, radially directed moving guides 11 of the plates 6. On their part, the plates are held by means of guide rollers 4 within ring-shaped guides 12 which are attached to the housing 31. The opening 13 of the plate 6 has the same width as the opening 3 of the gear toothed ring 1, and as the opening 40 of the housing 31. The dimensions of the openings correspond those of the largest diameter of the pipe which is to be moved.

Figure 3:
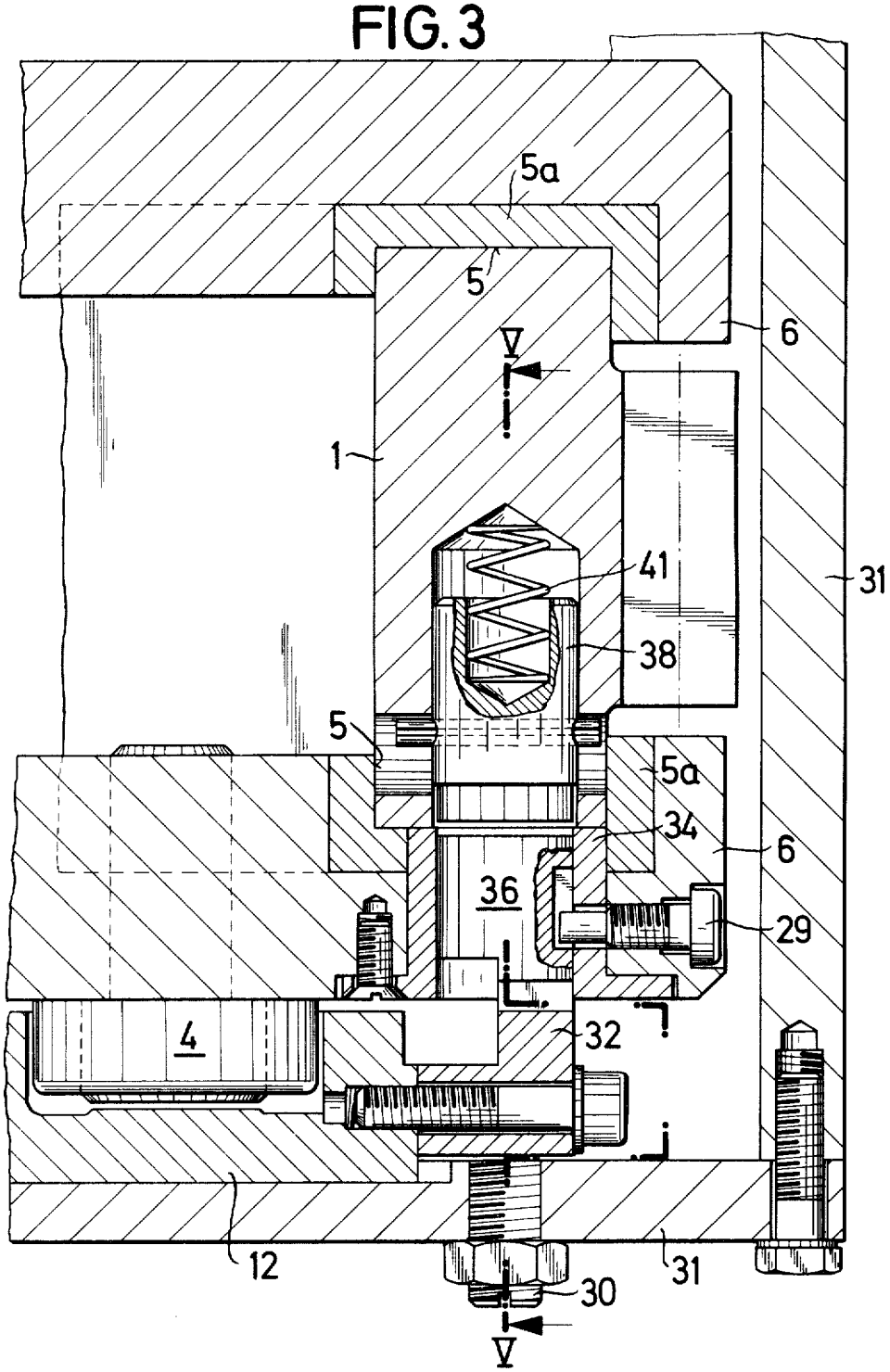
FIG. 3 shows a section through the retaining assembly for the case of counterclockwise rotation.
Figure 4:
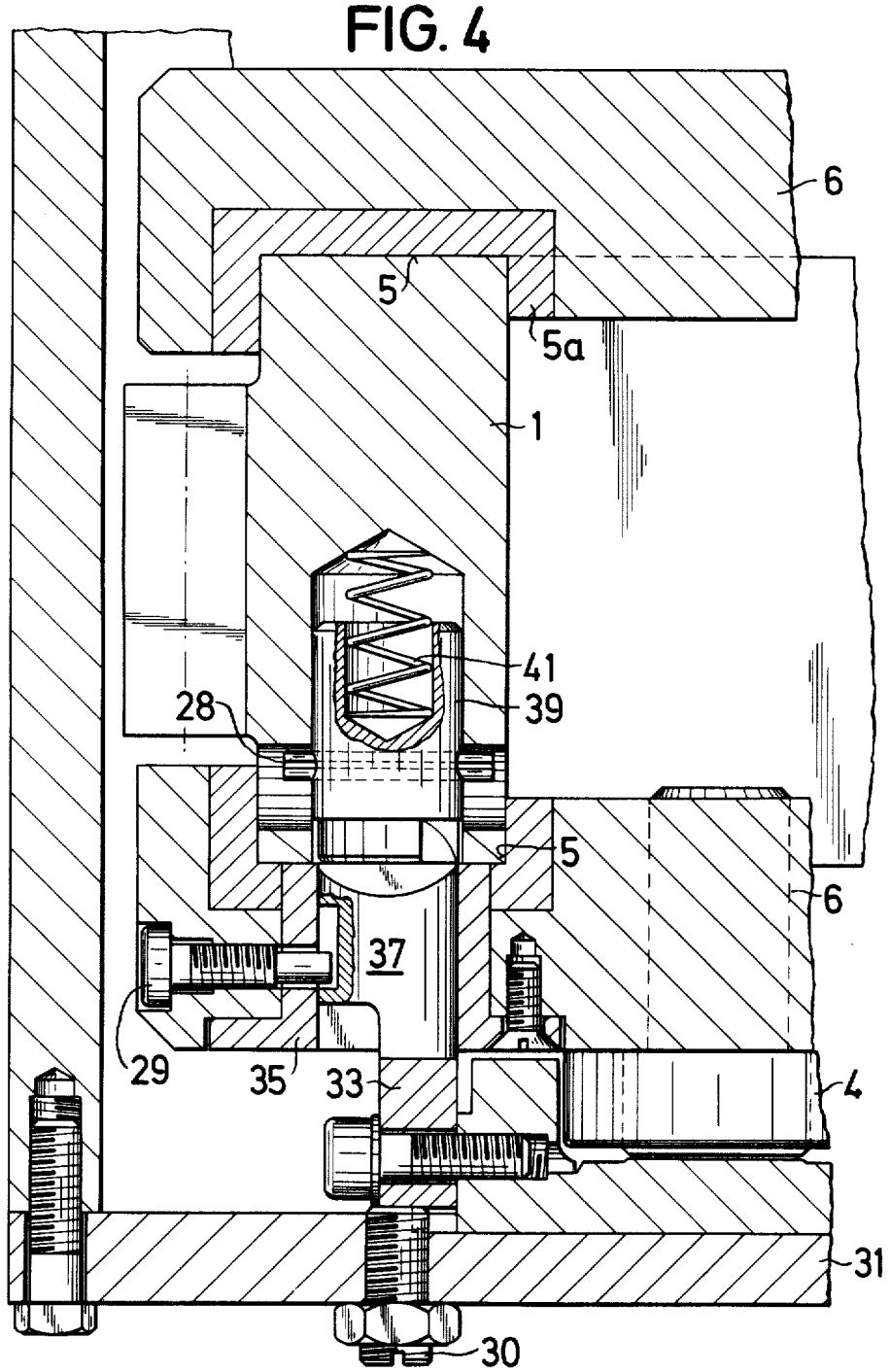
FIG. 4 shows a section through the retaining assembly for the case of clockwise rotation.
Figure 5:
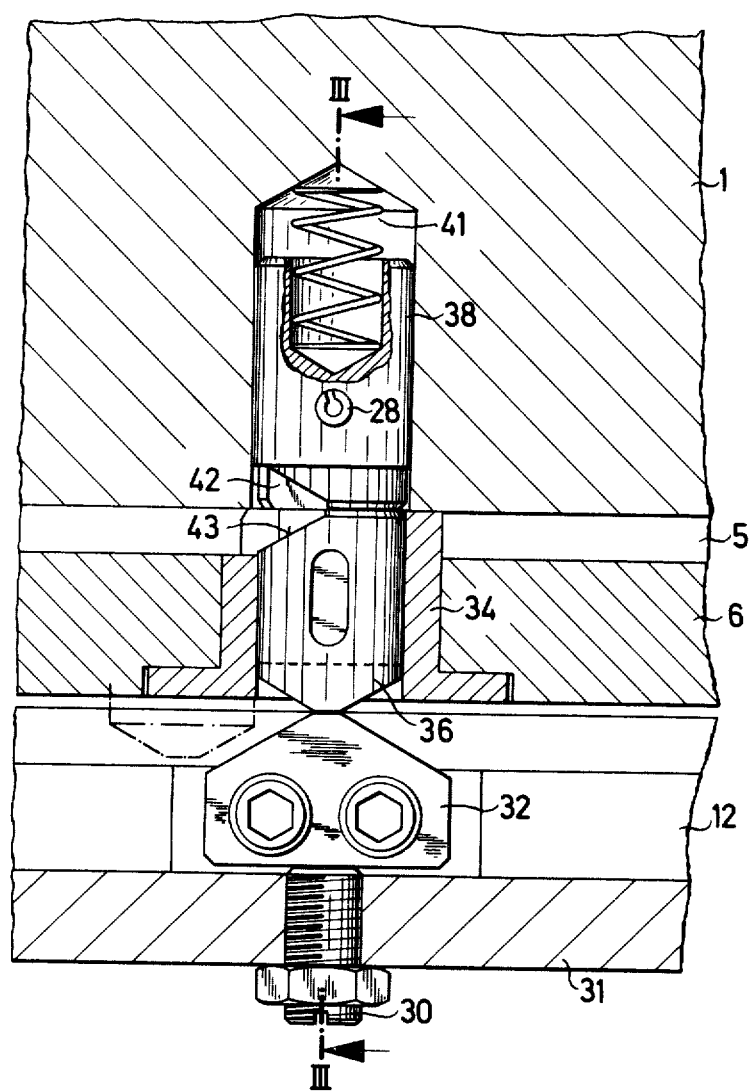
FIG. 5 shows the section along III — III of FIG. 3.

On both sides of the openings of the housing 31 one lifting cam 32 or 33 (FIGS. 3 to 5) is attached, which on passing through the plate 6 pushes the actuating pins 36 and 37, which are arranged in the bushings 34 and 35, in the upward direction. The bushing 34 and 35 are pushed upward in each case under the conditions when the openings 13 of the plates 6 coincide with the opening 40 of the housing 31, so that at this moment, the turning of the gear toothed ring 1 against the plate 6 becomes possible. After attainment of the torsional moment of a pipe which is normally screwed-in a clockwise direction, the openings of the gear toothed ring 1, of the plates 6 and of the housing 31 are displaced with respect to one another. To again obtain the condition when these openings again coincide with one another, the direction of rotation of the entire device has to be changed (counterclockwise direction). Hereby, the speed of the plate 6 is broken by a known braking system which is not illustrated. As a result of this, the gear toothed ring 1 first of all only rotates until the two openings 3 and 13 of the gear toothed ring 1 of the plate 6 coincide. This is simultaneously the position in which, in the case of counterclockwise direction, the retaining pins 38 and 39, which are carried in the gear toothed ring 1 and are spring-loaded through the action of spring 41, travel against the bushings 34 or 35 and take these along with them.

At both sides of the opening 40 of the housing 31, the grasping and centering doors 20 are pivoted on swivel pins. The doors 20 are operated through the activation of a hydraulic or pneumatic cylinder 21. The doors 20, as well as the housing 31, are provided with centering bars 22 which, in closed condition are tangent to the circumferencen of a pipe which is to be rotated, and through which an accurate centering is achieved. As in the case of all other known radially gripping systems, the device according to the present invention can also be suspended in the drilling rig. Prior to the gripping operation, the gripping and centering doors 20 are in open position. The power tong is now lightly pushed against the pipe until the maximum diameter of the pipe lies within the gripping range of the doors 20. Through valve action, the doors 20 close, so that the tong pulls itself against the pipe and, with the help of the centering bars 22, is centered with respect to the rotational axis of the pipe. Subsequently, the gear toothed ring 1 can be turned so far by the pinions 2, that the cam surfaces 16a or 16b of the cams 7a or 7b press the clamping jaws 9a and 9b against the pipe 10 in a clamping position. The openings of gear toothed ring 1 of the plates 6 are displaced almost by 180° with respect to one another, so that a closed system is created which can bear high loads.

In order to bring about the condition that the openings 3 and 13 cutaway sections of the gear toothed ring 1 and of the plates again coincide with one another, which is the prerequisite for the removal of the device from the pipe, the direction of rotation of the device must be changed. The gear toothed ring turns thereby so far, until the two openings 13 and 3 of the plates 6 and of the gear toothed ring 1 coincide with one another. In this position, the retaining pins 38 or 39 abut against the bushings 34 or 35 since, under the action of springs 41, they project in downward direction above the surface of the gear toothed ring 1. On further rotation, the plates 6 are now carried along until all openings of the toothed rim, of the plates and of the housing coincide, with one another. Hereby, due to the inclined surfaces of the actuating pins 36 or 37 onto which the retaining pins 38 and 39 slide, the latter are pressed so high by said actuating pins, until they can slide over the bushings 34 and 35. In this position, gear toothed ring 1 is free to turn in both directions of rotation so that, when needed, it can be turned further until the rollers 8a and 8b of clamping jaws 9a and 9b again abut against the cams 7a or 7b, only in reverse direction, and through the intervention of the dies of the clamping jaws grip the pipe.

In order to remove the device according to the present invention from the pipe, after reaching the state at which all openings coincide with one another, said device can be at once swung out of the way of the pipe by opening the doors 20. The operations of having to pole the tong once more against the pipe in order to manually open the doors are not longer needed. The danger of accidents connected with these hitherto necessary operations is completely eliminated. For the adaptation of the tong to the pipe diameters, the centering bars 22 have to be changed and these are made in such a way that they can be easily exchanged.

We claim:

1. A power tongs for rotating a pipe, for example, a casing pipe for boreholes, said power tongs comprising a toothed ring having an opening corresponding to the external diameter of the pipe to be rotated; a device for driving said ring; two circular plates between which said ring is positioned, said plates being provided with an opening having a width similar to the opening in said ring and being coaxial with said ring; clamping jaws on said plates, said jaws being arranged to act upon the pipe; cam means on the inner side of said ring, said cam means cooperating with respective ones of said clamping jaws; and means for automatically gripping the pipe and for subsequently turning said ring with respect to said circular plates in both directions of rotation, until the opening in said ring and the opening in said plates are mutually displaced by 180° and a closed ring-member is formed which is clamped on the pipe.

2. The power tongs according to claim 1, wherein said cams of said ring and said respective clamping jaws, are axially displaced with respect to one another such that each said cam can only be touched by said respective clamping jaw.

3. The tongs according to claim 1 further comprising a housing; lifting cams having two opposing inclined abutting surfaces, said lifting cams being arranged on said housing; the axially displaceable actuating pins arranged in said circular plates; retaining pins carried by said ring and responsive to said actuating pins; and locking devices in said circular plates for locking said retaining pins.

4. Device according to claim 3 wherein said locking device comprises a bushing having part of one side removed such that the bushing locks said retaining pin when said actuating pin is not on said lifting cam.

5. Device according to claim 3 wherein said lifting cams, said actuating pins and said retaining pins are arranged in pairs; mirror image with respect to one another and each said bushing has a section removed, so that said retaining pins, in the case of a clockwise rotation, pass said retaining pins in the case of counterclockwise rotation.

6. Device according to claim 3, wherein said retaining devices with their lifting cams, their actuating pins and their retaining pins and the said bushing are arranged on different radii so that they can pass by one another during rotation.

7. The tongs according to claim 3, wherein there is further included pivotable gripping and centering doors arranged on said housing, said doors being arranged on both sides of the respective opening of said housing for closing same.

8. The tongs according to claim 7, wherein each said gripping and centering door and said housing contains one centering bar arranged tangentially with respect to the circumference of the pipe.

* * * * *